United States Patent [19]

McCombie

[11] 3,748,264

[45] July 24, 1973

[54] METHOD AND APPARATUS FOR REMOVAL OF SURFACE LIQUIDS

[75] Inventor: Frederick Walter McCombie, London, England

[73] Assignee: Megator Pumps and Compressors Limited, London, England

[22] Filed: Aug. 31, 1971

[21] Appl. No.: 176,469

[30] Foreign Application Priority Data
Sept. 16, 1970  Great Britain.................... 44,226/70
Nov. 5, 1970   Great Britain.................... 52,799/70

[52] U.S. Cl.............. 210/65, 210/DIG. 21, 210/242
[51] Int. Cl........................... C02c 1/26, E02b 15/04
[58] Field of Search............... 210/83, 242, DIG. 21, 210/65; 61/1

[56] References Cited
UNITED STATES PATENTS

| 3,631,679 | 1/1972 | Fisch .................................... 61/1 F |
| 3,532,219 | 10/1970 | Valdespino .................. 210/DIG. 21 |
| 2,968,928 | 1/1961 | Wicklander .......................... 61/1 F |
| 3,508,652 | 4/1970 | Woolley...................... 210/DIG. 21 |
| 3,146,598 | 9/1964 | Smith ................................... 61/1 F |

Primary Examiner—Samih N. Zaharna
Assistant Examiner—T. A. Granger
Attorney—Arthur B. Colvin

[57] ABSTRACT

Method and apparatus for pumping away floating oil slicks comprises a barrier capable of being extended to form an enclosure surrounding the slick. The enclosure is contracted to concentrate the slick which can then more easily be pumped away.

6 Claims, 1 Drawing Figure

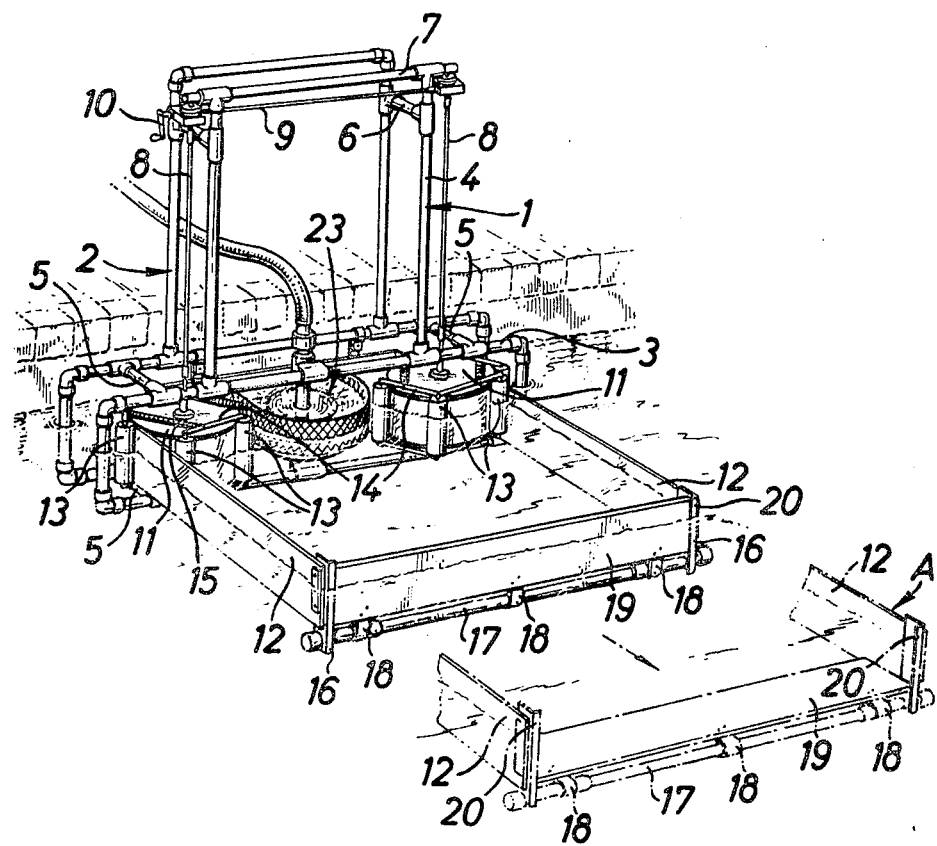

METHOD AND APPARATUS FOR REMOVAL OF SURFACE LIQUIDS

This invention is concerned with a method and apparatus for the removal of surface layers from liquids, for example the removal of floating oil slicks from water. A principal objective of the invention is to remove the surface layer, which may be in the form of a thin film, without taking up an appreciable quantity of the underlying liquid.

According to the present invention a floating surface layer is confined within an enclosure and the enclosure is contracted to reduce the area, and hence concentrate and/or increase the thickness of the confined layer. The apparatus in accordance with the present invention comprises a barrier element capable of being extended so as to form an enclosure and means for contracting the enclosure to reduce the area thereof.

Preferably the enclosure is defined by at least two extendible elements connected by a structure which is at least relatively rigid. According to another preferred feature of the invention that part of the rigid structure which constitutes a wall of the enclosure is movable to an open position clear of the floating layer when the extendible elements are being extended while when the extendible elements are being retracted to reduce the area of the enclosure the said part closes to act upon the confined floating layer.

In an embodiment of the invention an apparatus comprises a floatable support, two longitudinally aligned laterally spaced drums each mounted for rotational movement about the vertical axis, means for causing the said rotational movement, a resiliently flexible barrier strip wound around each drum, rotation of each drum in one sense causing the strip to extend forwardly and rotation of that drum in the other sense causing the strip to retract rearwardly, a rigid floatable structure connecting front end parts of the barrier strips and a gate constituting the front of said barrier hingedly carried by the rigid structure and movable between an open position when the barrier strips and the rigid structure are moved forwardly to extend the enclosure and a closed position when the said structure and the barrier strips are retracted to reduce the area of the enclosure.

A particular embodiment of the invention will now be described by way of example and with reference to the accompanying perspective drawing.

The apparatus shown in the drawing comprises a floating support frame-work made up of front and rear similar frames 1 and 2 mounted the one behind the other in longitudinally spaced relationship. Each frame consists of a lower laterally elongate rectangular part 3 and an upper rectangular part 4 extending from the upper cross-member of the part 3. Longitudinally extending stanchions 5 connect the lower parts 3 of the two frames while similar stanchions 6 connect the upper parts 4. The upper cross-member 7 of the front of the upper parts 4 is extended laterally outwardly to receive the upper end parts of vertically extending shafts 8. Each shaft 8 extends downwardly through the upper and lower cross-members of the front one of the frame parts 3. A drum 11 rotationally fast with each shaft 8 is positioned between the upper and lower cross-members of the front frame part 3. The upper end part of each shaft 8 carries a worm wheel. A shaft 9 extends across the upper part of the frame-work, is rotatable by a handle 10 and carries the worms. It will be noted that the one worm of the shaft 9 engages the front peripheral surface of one of the worm wheels while the other worm on the shaft 9 engages the rear peripheral surface of the other worm wheel. Rotation of the shaft 9 in one sense thus causes one of the drums 11 to rotate in one sense and the other of the drums to rotate in the other sense.

A barrier element 12 in the form of a resiliently flexible strip band of plastics or metal is wound around each of the drums. It will be noted that the band 12 is wound in one sense round one drum 11 and in the other sense round the other drum 11. Rotation of the shaft 9 in a particular sense will thus cause both bands 12 to be wound or unwound as the case may be. In order to ensure that the band extends forwardly in the manner illustrated when unwound rather than describing a spiral surrounding the drum, an assembly of spring loaded rollers bears against the peripheral surface of each band 12 wound around the drum. Each assembly comprises two sets of three rollers 13, the rollers of each set being pivotally connected to one another by linkages 14. Springs 15 connect the two sets to urge them towards one another and hence to urge the band 12 against the peripheral surface of the drum 11.

The front end of each band 12 is connected to a rigid dependent angle section strip 16 which extends downwardly below the lower edge surface of the band. An elongate cylindrical floatation element 17 connects the dependent end parts of the strips 16. A gate 19 for closing the front of a rectangular enclosure has hinge sleeves 18 through which the floatation element 17 extends as a hinge pin. When the bands 12 are being wound off the drums 11 to extend the rectangular enclosure hydraulic pressure acts rearwardly against the front surface of the gate 19 to pivot the gate downwardly and rearwardly through 90° to the open configuration indicated at A. The gate is submerged below the floating layer. When the bands 12 are wound onto the drums 11 to contract the rectangular enclosure hydraulic pressure acts against the rear face of the gate 19 to pivot the gate forwardly and upwardly to the closed position shown in the main drawing. Inwardly directed flanges 20 of the strips 16 provide stops to prevent the gate 19 pivoting in the closing sense beyond the closed position shown. In an alternative construction a hinge rod extends laterally between the upper end parts of the strips 16 and a gate for closing the front of a rectangular enclosure is hingedly connected to the rod. The gate comprises two parts disposed at right angles to one another, one rectangular part constituting the gate proper and the other part being an open frame consisting of side stays and a cross-member. When the bands 12 are being wound off the drums 11 to extend the rectangular enclosure hydraulic pressure acts rearwardly against the front surface of the rectangular part and against the cross-member to pivot the gate structure upwardly and rearwardly through 90° to an open position clear of the water. When the bands 12 are wound onto the drums 11 to contract the rectangular enclosure hydraulic pressure acts initially against the cross-member and thus against the rear face of the gate to pivot the gate structure downwardly and frontwardly to the closed position. Stops on the gate and the front end parts of the bands abut one another to prevent the gate pivoting in the closing sense beyond the closed position shown. The rear wall of the rectangular enclosure is constituted by a fixed band extending across the rear of the frame-work and having the end parts thereof resiliently urged against the outer peripheral surface of the drum (including any coils wound thereon) so as to maintain the rear wall of the enclosure when the bands are being retracted and the effective diameters of the drums are hence being increased.

In operation with the apparatus floating in water in the manner illustrated the buoyancy of the frames 1 and 2, the drums 11 and the front floatation element 16 is such that the bands are submerged to a predetermined extent. The handle 10 is wound to extend the bands 12 to enclose the surface layer that is to be removed. During this extension of the bands 12 the gate 19 at the front of the enclosure will open as shown at A. This is necessary to allow the surface layer to be surrounded. The handle is then wound in the winding-in sense, hydraulic pressure closes the gate 19 and the enclosed surface layer is reduced to a smaller area between the drums, the thickness of the layer being proportionally increased.

The apparatus of the present invention is completed by a skimming apparatus positioned between the drum 11 and generally identified by the reference numeral 23. This apparatus is preferably that forming the subject of our co-pending U.S. Pat. application Ser. No. 114,157 which can pump away the surface layer without simultaneously removing an appreciable amount of the underlying liquid. In the embodiment shown a centrally disposed suction pipe passing through a perforated strainer plate is surrounded by a circular weir. The lower end part of the pipe is positioned in a dish shaped chamber below the plate. The skimming apparatus is surrounded by a perforated coarse filtration basket.

An alternative embodiment comprises a front frame of substantial height carrying the barrier element in the form of a flexible band and the means for extending and retracting it and a horizontal shallow rear frame providing a support for the band when extended. The rear frame may be hingedly connected to the front frame so that it can be folded back against the latter when not in use, a pin or other suitable locking device securing it in either one or the other position. Both frames include buoyancy elements so that when the apparatus is placed in the water it floats in a stable manner with the rear frame level and submerged at such a depth that the band is partly below the surface of the liquid and partly above it. The front frame carries near one side a rotatable drum in bearing bushes on a vertical axle which is extended to a convenient height and fitted with suitable gearing, preferably of the worm type, through which it can be rotated by means of a handle. One end of the flexible band is fastened to the rotatable drum and the other end passes round a fixed guide drum near the other side of the front frame and extends across the front of this frame to which it is fastened in such a manner that it presses resiliently against the coils on the rotatable drum so as to make a seal and maintain a complete enclosure whether the band is extended or retracted. The drums provide buoyancy and can conveniently be filled with plastic foam.

When the apparatus in accordance with this embodiment is brought into use, the rear frame is first turned into its horizontal working position and secured by means of the locking device. The handle is then turned in a winding-out snese so that the band is extended rearwards in the form of an arc, supported on its bottom edge by the rear frame. The apparatus is then placed in the water so that the extended band surrounds the surface layer that is to be removed. The handle is then turned in a winding-in sense so that the area of the enclosed surface layer is reduced to a small area between the drums, the thickness of the layer being proportionately increased. The surface layer may then be ladled out or sucked up and pumped away by skimming apparatus such as is described in our co-pending U.S. Pat. application Ser. No. 114,157 without simultaneously taking up any appreciable amount of the underlying liquid. Such skimming apparatus can alternatively be incorporated into the front frame.

When it is desired to pick up a further adjoining patch of surface layer, the apparatus can be moved into a new position without lifting it out of the water. It can then be tilted forwards towards the operator with the rear frame inclined upwards so that the barrier element is clear of the water while being extended, and returned to its normal position when the barrier element is in position to embrace the further patch.

I claim:

1. Apparatus for confining and concentrating a surface layer on a liquid body comprising a flotable support, a spaced pair of drive drums mounted on said support, an elongated resilient barrier strip wound about each said drum, a rear wall portion connected to said support and forming a barrier extending between said strips adjacent said support, a flotation element connecting the ends of said strips, said strips, said rear wall portion and said flotation element including portions adapted to extend above and below said surface layer to thereby define an enclosure for said layer bounded by said strips, said rear wall portion, and said flotation element, drive means for rotating said drums selectively in a pay off and a wind on sense, respectively to pay said strips off and wind said strips onto said drums, said strips having substantial longitudinal stiffness whereby said flotation element is forced away from said support when said drums are rotated in said pay off sense, an opening in said flotation element and gate means movably mounted on said flotation element to seal and unseal said opening, activated respectively to hydraulic pressure, for unsealing said opening permitting passage of said layer through said opening when said flotation element is forced away from said support and for resisting passage of said layer through said opening when said element is moved toward said support.

2. The apparatus of claim 1 wherein said rear wall portion includes side portions resiliently urged against the peripheral surface of said strips on said drums to prevent leakage between the resiliently engaged parts.

3. A floating enclosure perimeter adapted to encompass a variable surface area of a liquid body, said enclosure perimeter including as a boundary at least two elongated barrier strips adapted to extend above and below said surface, mounting means for winding in and paying out said strips thereby respectively to decrease and increase the surface area encompassed within said enclosure, at least one opening between said strips, a gate movably mounted in said opening, said gate being shiftable between first and second positions, respectively, permitting fluid flow through said opening and sealing said opening against flow therethrough, said gate being mounted to be hydraulically shifted to said first position during paying out of said strips, and to said second position upon winding in of said strips.

4. Apparatus for confining and concentrating a surface layer of a liquid, such apparatus comprising a floatable support, two longitudinally aligned, laterally spaced drums mounted for rotational movement about spaced vertical axes, drive means for causing the said rotational movement, a respective resiliently flexible barrier strip wound around each drum, rotation of the drive means in one sense causing the strip on each drum to extend forwardly and rotation of the drive means in the other sense causing the strips to retract rearwardly, a rear wall portion adjacent said support forming a continuous confining barrier between said strips, a rigid floatable structure connecting the front end parts of said barrier strips, said strips, rear wall, and floatable structure together defining a continuous perimeter enclosing a variable area of said body, an opening in said floatable structure and a gate constituting the front of said structure hingedly carried by said rigid structure, said gate being normally disposed in closing position of said opening and being moved out of said opening by water pressure acting thereagainst responsive to movement of said structure away from said support, and being shifted to a closing position of said opening responsive to movement of said rigid structure toward said support to reduce the enclosed area.

5. Apparatus for confining a surface layer of a liquid, such apparatus comprising a floatable support, a pair of drums rotatably mounted on said support, a resilient barrier strip wound around each drum, said strips being adapted to be disposed in partially submerged position, means for rotating the drums to extend and retract the partially submerged strips, a partially submerged rear wall portion adjacent said support extending between and forming a barrier with said strips, a partially submerged rigid structure connecting the ends of the strips, said rear wall, strips, and structure together defining a continuous perimeter, an opening formed in said structure, closure means mounted on said structure and shiftable between clearing and sealing positions of said opening, said closure means being moved to said clearing position responsive to movement of said structure through said liquid during extension of said strips and being shifted to said sealing position by said liquid responsive to retraction of said strips, whereby said layer is permitted to pass through said opening into said perimeter during said extension, and is precluded from passing through said opening during retraction of said strips.

6. The method of concentrating a surface layer on a body of liquid through the use of a partially submerged continuous perimeter, at least one wall of which is defined by an extensible barrier strip assembly including two strip components having an opening formed therebetween and a closure movably mounted within said opening and shiftable responsive to movement through said liquid between sealing and unsealing positions of said opening, said closure being shifted to said unsealing position responsive to increase in area of said perimeter and being shifted to said sealing position responsive to decrease of area of said perimeter, which comprises the steps of floating said barrier strip assembly on said body of liquid, with said assembly partially submerged, extending said strip components to increase the area of said body encompassed within said perimeter to thus simultaneously cause said closure to move to the unsealing position thereof, thereby to cause liquid to flow through said opening, and thereafter retracting said strip components to reduce the area encompassed within said perimeter to thus cause said closure to be shifted to said sealing position whereby said surface layer within said perimeter is concentrated as a result of said retraction.

* * * * *